Figure 1:
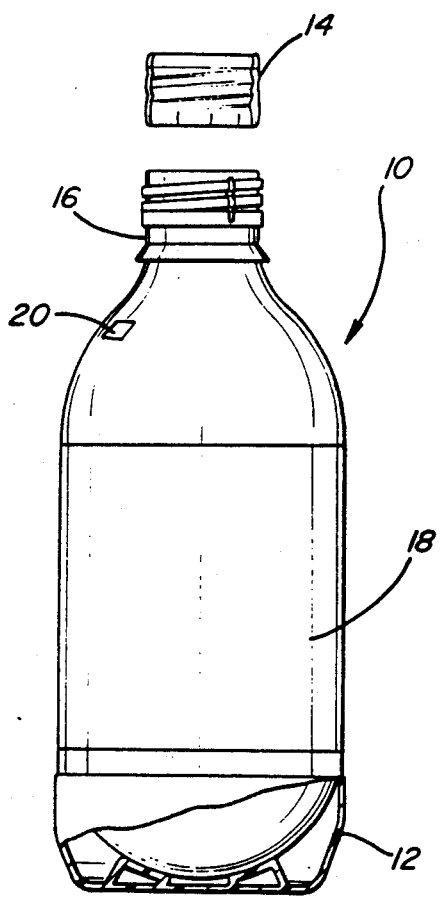

United States Patent [19]

Martin et al.

[11] Patent Number: 4,956,033

[45] Date of Patent: Sep. 11, 1990

[54] PROCESS FOR RECLAIMING PLASTIC CONTAINERS

[75] Inventors: Norman R. Martin, 54 Rose Brier Dr., Rochester Hills, Mich. 48309; Barclay J. McMullen, Bloomfield Hills, Mich.

[73] Assignee: Norman R. Martin, Rochester Hills, Mich.

[21] Appl. No.: 355,278

[22] Filed: May 22, 1989

[51] Int. Cl.⁵ .................... B32B 35/00; B32B 31/18
[52] U.S. Cl. ............................................ 156/94; 15/59;
134/104.4; 156/154; 156/250; 156/344;
156/510; 156/584; 264/37
[58] Field of Search .............. 15/59, 60; 134/104.4;
156/154, 344, 250, 510, 584, 94; 264/37

[56] References Cited

U.S. PATENT DOCUMENTS

| | | | |
|---|---|---|---|
| 3,3176,642 | 5/1967 | Bailey | 264/230 |
| 3,662,453 | 5/1972 | Meal et al. | 156/344 X |
| 3,870,181 | 3/1975 | Sincock | 215/1 C |
| 4,033,804 | 7/1977 | Baldyga | 156/84 |
| 4,067,826 | 1/1978 | Emery | 264/37 X |
| 4,599,131 | 7/1986 | Matuszak | 156/584 |
| 4,715,920 | 12/1987 | Ruppman et al. | 156/344 |
| 4,717,442 | 1/1988 | Hopson | 156/584 |
| 4,830,699 | 5/1989 | Burlet et al. | 156/344 |

Primary Examiner—Robert A. Dawson
Attorney, Agent, or Firm—Harness, Dickey & Pierce

[57] ABSTRACT

A process for reclaiming plastic containers includes the steps of providing containers having an adhesive composition affixed thereto, sorting the containers, and internally pressurizing the containers. The steps also include adding heated liquid into the containers for liquefying residue within the containers and for loosening an adhesive composition affixed to the containers. The steps further include allowing the containers to depressurize, removing the liquid from the containers, and granulating the containers thereby forming granular masses.

15 Claims, 1 Drawing Sheet

PROCESS FOR RECLAIMING PLASTIC CONTAINERS

BACKGROUND OF THE INVENTION

1. Technical Field

The present invention is directed toward a process for reclaiming plastic containers. More particularly, the invention is useful when reclaiming plastic such as what is commonly known in the industry as one half liter, one liter, two liter and three liter polyethylene terephthalate containers or containers of similar composition. These types of containers are used in the beverage industry and are what are generally known as "disposable" containers. Various techniques have been developed for reclaiming and/or recycling plastic beverage containers. However, these various techniques have certain drawbacks which are not associated with the present invention.

U.S. Pat. No. 4,033,804 (Baldyga) discloses a process of reclaiming thermoplastic articles. Baldyga teaches that the bottle is delabeled by relieving orientation stresses beneath the label sufficiently to cause enough shrinkage for the bottle and the label to separate.

U.S. Pat. No. 3,317,642 (Bailey) teaches and describes a method for stabilizing the volume of a plastic container, such as a plastic milk bottle. In other words, Bailey discloses a method of producing plastic containers with calibrated volumes.

U.S. Pat. No. 3,662,453 (Meal, et al) discloses an apparatus and a process for stripping a heat shrinkable material extending peripherally about a rigid article such as an electrical connector.

U.S. Pat. No. 3,870,181 (Sincock) teaches the manufacture of a beverage bottle formed under pressure wherein the bottle consists primarily of polymerized acrylonitrile monomer.

U.S. Pat. No. 4,067,826 (Emery) teaches a method for recovering mixed plastic materials from the group consisting of at least polyvinyl chloride and polyethylene.

U.S. Pat. No. 4,599,131 (Matuszak) discloses a high speed rolling apparatus for delabeling plastic containers. Matuszak teaches that a series of rollers flatten the plastic bottle, that some of the rollers provide heat to the flattened bottle for loosening the bottle label, and that brush rollers eventually remove the label from the bottle.

Unfortunately, these prior approaches have their own set of drawbacks. For example, Baldyga (U.S. Pat. No. 4,033,804) requires shrinkage of the bottle before the label can be removed. Matuszak (U.S. Pat. No. 4,599,131) requires heat; that the bottle be flattened and thereafter scrubbed by brush rollers before the label can be removed.

The present invention does not require such a complicated series of steps for its operation. Therefore, the present invention can be economically and easily adapted for reclaiming containers.

2. SUMMARY OF THE INVENTION

A primary object of the present invention is to provide a process for reclaiming plastic containers. The reclaimed plastic containers can thereafter be recycled and used in the beverage or other industries where polyethylene terephthalate or similar plastics are used.

It is another object of the present invention to provide a process for reclaiming plastic containers which is economical to operate and use.

Pursuant to the present invention, the process includes the steps of providing used beverage containers, sorting those containers according to their volume, removing the tamper resistant ring, uncapping the container if it has not already been uncapped, expanding the container through pressure, injecting heated liquid into the container, removing the label from the container, granulating the delabeled container and removing any excess liquid therefrom. The granulated container can then be recycled.

Another feature in accordance with the present invention can be the removal of the base from the container. This is particularly so, when the base and the container are composed of different plastic compositions. Further, the base can also be recycled.

Within the scope of the present invention, the containers can be sorted by volume either by hand or with an electromechanical sorter available in the industry. Further, the bottles can, if desired, be sorted by color either by hand or by any suitable device in the art.

Additionally and in accordance with the present invention, the liquid can be water or any other suitable liquid which will, loosen, dissolve and/or remove remaining residue from the container.

Further still and within the scope of the present invention, the removal of the tamper resistant seal, the uncapping of the containers can be done manually or with mechanical apparatus. Moreover, whether a container is capped or uncapped can be detected by a commercially available sensor.

DESCRIPTION OF THE INVENTION

Although the disclosure hereof is detailed to enable those skilled in the art to practice the invention, the embodiment disclosed herein merely exemplifies the present invention which can also be embodied in other processes.

Viewing FIG. 1, container 10 can be what is known in the industry as a one-half, one, two or three liter container. Container 10 is generally composed of polyethylene terephthalate or other similar plastic.

Container 10 is provided with base 12 for supporting container 10 in an upright position when container 10 is filled with a beverage (not shown). Base 12 is generally composed of high density polyethylene.

Container 10 is further provided with cap 14 and tamper resistant ring 16 for insuring the integrity of the beverage under pressure until the beverage is to be consumed. Cap 14 and tamper resistant ring 16 can be secured to container 10 via any manner acceptable in the art.

Further still, container 10 can be provided with container label 18 for identifying the beverage in container 10. Container label 18 can be composed of polyethylene terephthalate or other materials such as paper or plastics other than polyethylene terephthalate.

Base 12 and container label 18 are adhered to container 10 with glue or other suitable composition for affixing base 12 and container label 18 to container 10. More often than not, container 10 is also provided with pricing label 20. Pricing label 20 can be composed of paper with an adhesive backing for affixing pricing label 20 to container 10.

Figure 2:
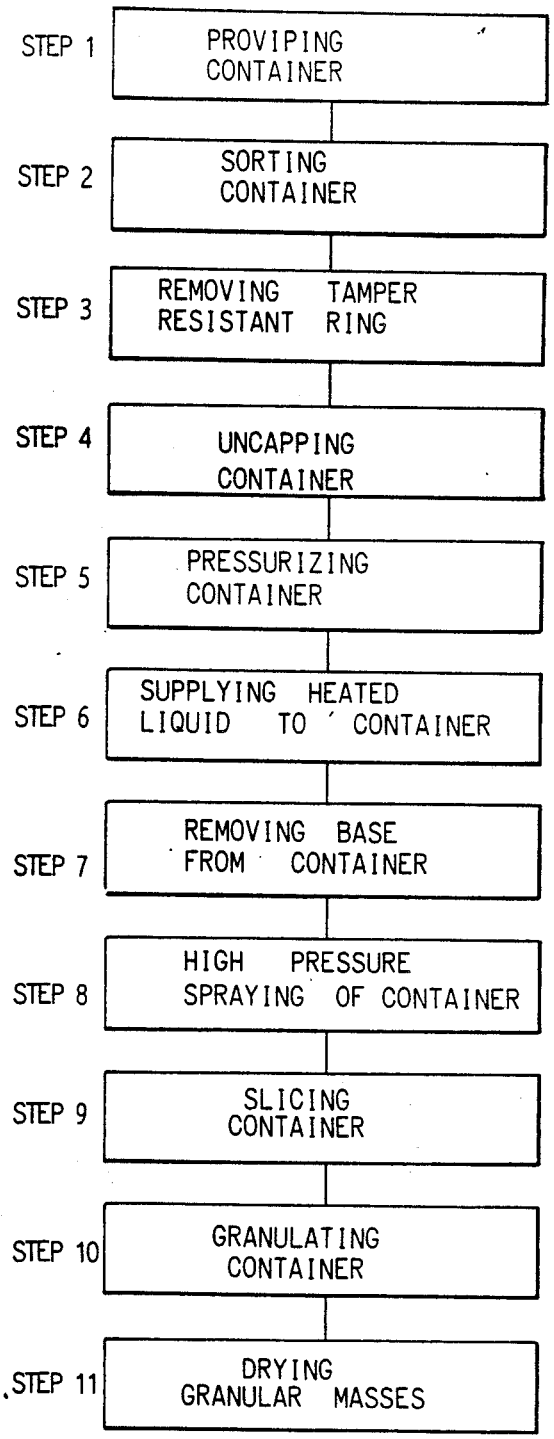

Turning to FIG. 2, a schematic of the present invention, the various steps of the present invention are described. In step 1 used beverage containers 10 or containers which do not pass quality control standards at manufacture are provided. In step 2 beverage containers 10 are sorted by volume. Further, an additional step of sorting the containers by color can be performed (not shown in FIG. 2) The sorting of the containers by either volume or color can be done manually or electromechanically with the use of commercially available sorters.

In Step 3, after the containers have been sorted, tamper resistant ring 16 is removed from container 10 either manually or with an electromechanical apparatus suitable for that purpose as container 10 is transported through the process in accordance with the present invention.

Step 4 includes the uncapping of the beverage container, if it is required. This uncapping can be performed either manually or with commercially available electromechanical apparatus. More particularly, Step 3 and Step 4 can be performed simultaneously or in inverse order.

After Step 4, uncapped container 10 are transported to an electromechanical apparatus wherein the apparatus can provide internal pressure and heated liquid to the internal uncapped container 10. The aforenoted commercially available electromechanical apparatus is similar or identical to the apparatuses used by the bottling industry in pressurizing the container and filling the container with the beverage which will ultimately be sold to the consuming public.

Step 5 includes the internal pressurization of container 10. From about 18 pounds per square inch to about 40 pounds per square inch of pressure are provided to container 10. This internal pressurization of container 10 causes container 10 to expand outwardly thereby expanding label 18. When label 18 is expanded in this manner it is stretched away from container 10 and thereafter is not as stringently adhered to container 10.

In Step 6 at least one ounce of heated liquid is supplied or injected into the beverage container for first liquefying any remaining residue within the container and second causing heat transfer from the internal container to the adhesive composition affixing identifying label 18 and base 12 to container 10. The heated liquid can be water or any other suitable liquid which will remove any remaining residue from container 10. It has been determined that the heated liquid operates proficiently from about 125° F. to about 190° F. However, it has further been determined that a more preferred liquid temperature for removing residue and loosening the adhesive composition affixing identifying label 18 and base 12 to container is from about 180° F. to about 190° F.

Importantly, Step 5 and Step 6 can be performed simultaneously or in reverse order. Further, container 10 can have the heated liquid added and be pressurized at the same time.

Because of the thermal forces involved, when the heated liquid is added to container 10, additional expansion is created in container 10, label 18 and base 12.

As previously specified, at least one ounce of heated liquid is injected into container 10. This volume of heated liquid is sufficient for loosening any adhesive which has been used to affix base 12 or label 18 to container 10.

After the adhesive securing base 12 to container 10 has been loosened, Step 7 includes removal of base 12 from container 10 either manually or electromechanically with any commercially acceptable device within the industry. Additionally, it has unexpectedly been determined that the use of an abrasive pad contacting base 12 while container 10 is being transported toward its next step in the process within the scope of the present invention is sufficient for removing base 12 from container 10. After base 12 is removed from container 10, base 12 is transported for granulation and is ultimately packaged for shipment and recycling.

It should be understood at this time, that when identifying label 18 and container 10 are manufactured of the same or similar material, it is unnecessary to separate identifying label 18 from container 10. Thus, after depressurization, both label 18 and container 10 can continue through the process in accordance with the present invention for ultimate recycling without the requirement of removing label 18 from container 10.

However, more often than not, the labels affixed and/or attached to the beverage containers are not manufactured of the same composition as the container, i.e. polyethelene terephthalate or a composition compatible therewith. It then is necessary to continue the steps within the scope of the present invention. For example, many times a retailer will affix a paper-type adhesive retail pricing label to the container on or above the container label. When such an event occurs, step 6 in accordance with the present invention can supply heated liquid for filling the container to a preselected level for loosening the aforenoted retail pricing label. After the retail pricing label has been loosened, it is easily removed. Step 6 can provide from about one ounce of heated liquid to about the entire internal volume of the container of heated liquid for loosening adhesive.

Step 8 includes transporting container 10 through a series of high pressure sprayers During step 6, container 10 is allowed to depressurize (i.e., return to atmospheric pressure. Additionally, during step 6,7 and 8 container 10 is allowed to cool which causes label 18 to be further separated from container 10. It has been determined within the scope of the present invention that container's 10 volume during cooling returns to within plus or minus 10% of its original volume. As previously indicated, the high pressure sprayer removes any remaining labels from container 10. It has been determined that the high pressure sprayers operate proficiently when applying from about 300 pounds per square inch to about 1500 pounds per square inch of sprayer pressure to container 10. A more preferable range of sprayer pressure to be applied to container 10 is from about 750 pounds per square inch to about 850 pounds per square inch.

After container 10 has been subjected to high pressure spraying, it is subjected to Step 9 wherein container 10 is sliced diametrically through about 80 to 95% of its diameter. At this juncture, the heated liquid is released from container 10. This heated liquid can be recycled if desired. Further, it has been determined that Step 9 is more proficiently performed by slicing container 10 at approximately one inch from the bottom of container 10.

Container 10 is transported for granulation and Step 10 includes granulation of container 10 wherein granular masses are formed. Granulation is accomplished by any device commercially acceptable within the art.

Step 9 is not a prerequisite for Step 10, if the heated liquid is removed from container 10 before granulation in another manner. For example, container 10 can be drained either manually or electromechanically by turning container 10 upside down and allowing the heated liquid to drain. However, it has been determined with the use of Step 9 the entire process within the scope of the present invention can be practiced more efficiently.

Step 10 granular masses are dried in accordance with Step 11 to remove any remaining liquid.

Step 11 can be performed with any dryer commercially acceptable for that purpose, for example, a spin dryer. After the granular masses are dried they are transported for packaging and for shipment for ultimate reclaiming.

Having set forth the description of their invention, Applicants now turn to the claims directed to their invention. It being understood that the claims appended hereto define the scope of Applicants' invention.

What is claimed is:—

1. A process for reclaiming plastic containers, comprising the steps of:
   (a) Providing used containers or containers which do not pass quality control standards at manufacture having an adhesive composition affixed thereto;
   (b) Sorting said containers according to volume;
   (c) Removing a tamper resistant ring from said container, if required;
   (d) Uncapping said container, if required;
   (e) Internally pressurizing said container from about 18 pounds per square inch to about 40 pounds per square inch;
   (f) Adding at least one ounce of heated liquid into said container for liquefying residue within said container and for loosening an adhesive composition affixed to said container;
   (g) Allowing said container to depressurize;
   (h) Removing a base from said container, if required;
   (i) Removing a label from said container, if required, by external spraying;
   (j) Removing said liquid from said container;
   (k) Granulating said container thereby forming granular masses; and
   (l) Removing excess liquid from said granular masses.

2. The process of claim 1 wherein said heated liquid is water having a temperature from about 125° F. to about 190° F.

3. The process of claim 2 wherein said water has a temperature from about 180° F. to about 190° F.

4. The process of claim 1 wherein steps 1(c) and 1(d) are performed simultaneously.

5. The process of claim 1 wherein step 1(d) is performed prior to step 1(c).

6. The process of claim 1 further including granulation of said base for reclaiming.

7. The process of claim 1 further including adding from about one ounce of heated liquid to about the entire internal volume of said container with heated liquid.

8. The process of claim 7 wherein said internal volume is pre-selected.

9. The process of claim 1 wherein said internally pressurizing of said container is from about 18 pounds per square inch to about 40 pounds per square inch of said container.

10. The process of claim 1 wherein said external spraying of said container is from about 300 pounds per square inch to about 1500 pounds per square inch.

11. The process of claim 10 wherein said external spraying is from about 750 pounds per square inch to about 850 pounds per square inch.

12. The process of claim 1 wherein said heated liquid is removed from said container by slicing said container diametrically through about 80 to about 95% of its diameter.

13. The process of claim 12 wherein said slicing occurs about one inch from a bottom of said container.

14. A process for reclaiming plastic containers, comprising the steps of:
   (a) providing container having an adhesive composition affixed thereto;
   (b) sorting said containers;
   (c) removing a tamper resistant ring from said container, if required;
   (d) uncapping said container, if required;
   (e) internally pressurizing said container;
   (f) adding heated liquid into said container for liquefying residue within said container and for loosening an adhesive composition affixed to said container;
   (g) allowing said container to depressurize;
   (h) removing a base from said container, if required;
   (i) removing a label from said container, if required, by external spraying;
   (j) removing said liquid from said container; and
   (k) granulating said container thereby forming granular masses.

15. A process for reclaiming plastic containers, comprising the steps of:
   (a) providing containers having an adhesive composition affixed thereto;
   (b) sorting said containers;
   (c) internally pressurizing said container;
   (d) adding heated liquid into said container for liquefying residue within said container and for loosening an adhesive composition affixed to said container;
   (e) allowing said container to depressurize;
   (f) removing said liquid from said container; and
   (g) granulating said container thereby forming granular masses.

* * * * *

UNITED STATES PATENT AND TRADEMARK OFFICE
CERTIFICATE OF CORRECTION

PATENT NO. : 4,956,033

DATED : September 11, 1990

INVENTOR(S) : Norman R. Martin et al.

It is certified that error appears in the above-identified patent and that said Letters Patent is hereby corrected as shown below: ON TITLE PAGE:

Under References Cited "U.S. Patent Documents",

"3,3176,642" should be --3,317,642--

Column 3, line 3,
after "2)" insert --.--

Column 3, line 19,
"are" should be --is--

Column 3, line 50,
after "container" insert --10--

Column 4, line 34,
after "sprayers" insert --.--

UNITED STATES PATENT AND TRADEMARK OFFICE
CERTIFICATE OF CORRECTION

PATENT NO. : 4,956,033

DATED : September 11, 1990

INVENTOR(S) : Norman R. Martin et al.

It is certified that error appears in the above-identified patent and that said Letters Patent is hereby corrected as shown below:

Column 4, line 36,
after "pressure" insert --)--

Column 4, line 36,
"step" should be --steps--

Column 4, line 40,
"container's 10 volume" should be --the volume of the container 10--

Column 6, line 3, claim 14,

"container" should be --containers--

Signed and Sealed this

Twenty-eighth Day of April, 1992

Attest:

HARRY F. MANBECK, JR.

Attesting Officer     Commissioner of Patents and Trademarks